United States Patent [19]

Rost

[11] 4,371,383
[45] Feb. 1, 1983

[54] RADON REMOVAL SYSTEM

[76] Inventor: K. Lennart Rost, P.O. Box 23, Readfield, Me. 04355

[21] Appl. No.: 224,028

[22] Filed: Jan. 12, 1981

[51] Int. Cl.³ .............................................. B01D 19/00
[52] U.S. Cl. ...................................... 55/169; 55/192; 55/194; 55/201; 55/274
[58] Field of Search ....................... 55/41, 52, 66, 186, 55/192–194, 199, 201, 202, 169, 274; 423/249, 262

[56] References Cited

U.S. PATENT DOCUMENTS

| | | | |
|---|---|---|---|
| 1,727,733 | 9/1929 | Stovall | 55/52 |
| 2,020,250 | 11/1935 | Stephens et al. | 55/193 X |
| 2,663,379 | 12/1953 | Doan | 55/201 X |
| 3,517,487 | 6/1970 | Burnham, Sr. | 55/192 |
| 3,940,471 | 2/1976 | Favre | 55/66 X |

FOREIGN PATENT DOCUMENTS

| | | | |
|---|---|---|---|
| 872627 | 4/1953 | Fed. Rep. of Germany | 55/194 |
| 1472398 | 5/1977 | United Kingdom | 55/201 |

OTHER PUBLICATIONS

Charles T. Hess et al., Radon-222 In Potable Water Supplies In Maine: The Geology, Hydrology, Physics and Health Effects, 9/1979, Lane & Water Resources Center University of Maine at Orao, Proj. A-045-ME Contract A-272-A.

Primary Examiner—Robert H. Spitzer

[57] ABSTRACT

The radon removal system includes a reactor tank with a first inlet and spray head connected to the water supply for directing and spraying water into the tank. The tank is provided with an outlet at the base of the tank and a second inlet and spray head operatively coupled to the outlet through a pump for recycling and respraying the water in the reactor tank to purge the water of radon gas. A splash plate arrangement supported in the tank increases the spray effect by impingement and deflection of the water, breaking up the water droplets for release of radon gas. A ventilation arrangement with inlet and outlet spaced apart at the top of the tank vents the released radon gas away from the tank. A blower can be provided.

6 Claims, 3 Drawing Figures

RADON REMOVAL SYSTEM

FIELD OF INVENTION

This invention relates to a new and improved apparatus and system for degassing or purging potable water supplies of radioactive gas Radon-222 and related products of radioactive decay.

BACKGROUND OF THE INVENTION

The presence of radioactive gas $^{222}$Rn in water supplies of New England and elsewhere in the world has been known and reported since early in this century. Particularly high levels have been detected and measured in water supplies derived from granitic rock such as found in Maine and New Hampshire. Radon 222 and the various radon daughters enter the ground water by decay of naturally occurring uranium found in such granites. Recent studies express concern over possible correlation of high radon levels in water and air with excess cancers in the exposed population. See *Radon-222 in Potable Water Supplies in Maine: The Geology, Hydrology, Physics & Health Effects* by Charles T. Hess et al., Land & Water Resources Center, University of Maine, Orono, Maine 04773, September, 1979.

As the foregoing study points out, exposure to radon in water supplies is through two pathways. One is direct ingestion of the water. Second, because randon is only weakly dissolved and is easily given up by water as a gas, it may be inhaled after partitioning or separation of the radon into the air from radon enriched water. The University of Maine Land & Water Resources Center recommends that anyone with concentrations of radon greater than 10,000 pCi/l (pico Curies per liter) should take steps to use a different water supply, install radon removal equipment such as some type of aeration system, or provide adequate ventilation and air turnover in all high water use rooms.

Prior Art Statement

It is suggested in the foregoing study that radon removal can be achieved by water aeration and two approaches are suggested. According to one approach the water is subjected to bubbling or effervescence. Such bubbling, however, is inefficient and requires excessive time for only modest degassing. Furthermore because of the disruption of the water, it may become turbid and colored if the bubbling is carried out in the well or in a storage tank. According to the other suggested approach water is degassed by fine spraying into a shallow tray or container. Multiple stages of spraying through several trays is proposed for reducing the radon to background levels. Only manual equipment is described with repetition of the equipment in each stage of the manual operation.

Objects of the Invention

It is therefore an object of the present invention to provide an automatic radon removal system for purging potable water supplies of the radioactive gas $^{222}$Rn and its daughters.

Another object of the invention is to provide a simple system which reduces radon content of water supplies to background levels without duplication of equipment.

A further object is to provide an inexpensive efficient radon degassing system with minimum space requirements suitable for individual domestic use as well as larger scale uses.

Summary of the Invention

In order to accomplish these results the present invention provides a reactor tank with a first inlet and spray head connected to the water supply for directing and spraying water into the tank. The tank is provided with an outlet at the base of the tank and a second inlet and spray head operatively coupled to the outlet through a pump for recycling and respraying the water in the reactor tank to purge the water of the radon gas. A spray plate or splash plate arrangement supported in the tank increases the spray effect by impingement and deflection of the water, breaking up the water droplets for release of radon gas. A ventilation arrangement with inlet and outlet spaced apart at the top of the tank vents released radon gas away from the tank. A blower can be provided.

A feature and advantage of the foregoing arrangement according to the present invention is that water sprayed into the tank can be recycled and resprayed through multiple cycles until the radon content is reduced to background levels.

The invention also provides a novel method of operation, control sequence and automatic control system of valves and switches so that the reactor tank is regularly filled and maintained at a desired level, and so that the pressure in a water use system coupled to the outlet is regularly restored and maintained at a desired level. Moreover, a timer is incorporated as an integral part of the control system. Water sprayed into the reactor tank is recycled and resprayed during a specified timer period for removing and venting radon gas whenever the reactor tank is refilled.

Other objects, features and advantages of the invention will become apparent in the following specification and accompanying drawings.

DESCRIPTION OF PREFERRED EMBODIMENT AND BEST MODE OF CARRYING OUT THE INVENTION

Figure 1:
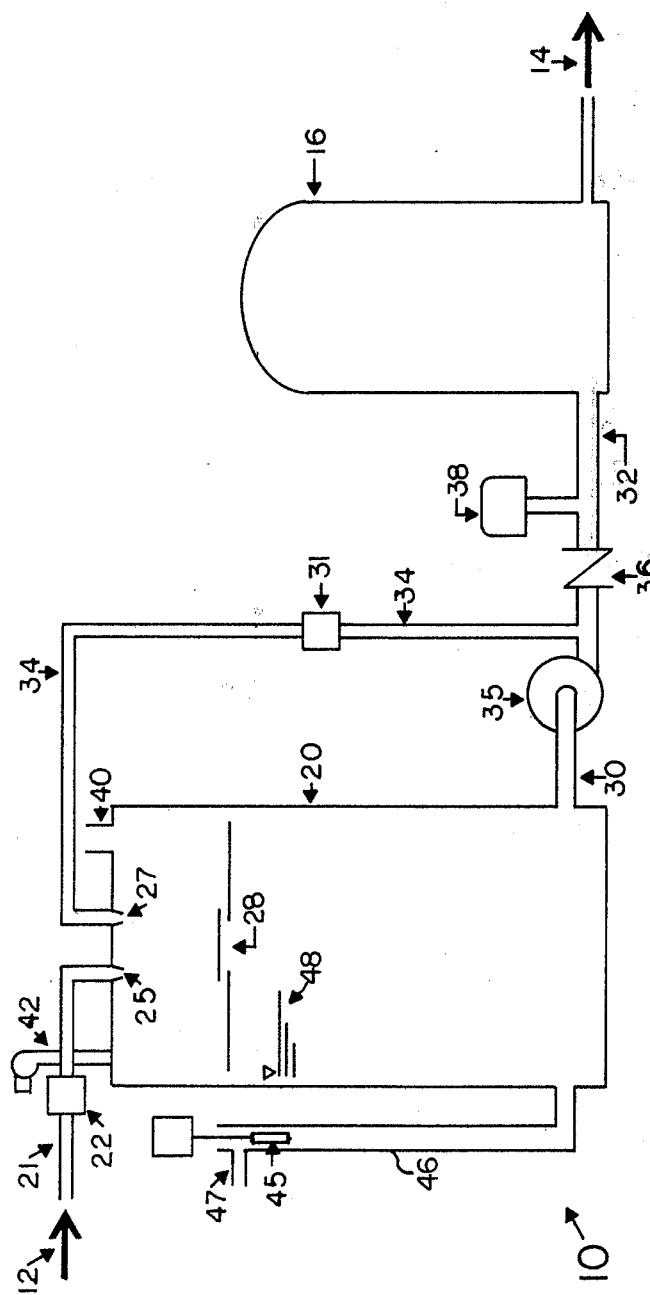
FIG. 1 is a simplified diagrammatic view of a radon removal system according to the present invention.

In the embodiment of the invention illustrated in FIG. 1, a radon removal system 10 is coupled between a well or other source of water indicated generally by the incoming arrow 12, and a water use system such as a house water system indicated generally by outgoing arrow 14. A portion of the domestic use system in the form of the standard pressure storage tank 16 is shown coupled to the outlet pathway 32 of the radon removal apparatus 10.

At the heart of the radon removal apparatus is the reactor tank 20 with a capacity of, for example, 70 gallons (294 liters) in which the radon gas partitioning takes place. Water from the water source 12 enters reactor tank 20 through inlet line 21, valve 22, and a first spray head 25. Valve 22 may be, for example, a normally closed ¾" (1.9 cm.) solenoid valve, while the spray head 25 is dimensioned to provide a fine spray at a desired rate for refilling reactor tank 20. Water sprayed into the reactor tank strikes or impinges upon the baffle plates or splash plates 28. The splash plates 28 increase the spray effect and enhance break up of the water droplets for release of radon gas.

Outlet 30 at the base of the reactor tank 20 is connected through pump 35 and divides into two pathways 32 and 34. Conduit 34 returns to the top portion of the reactor tank through valve 31 and provides a second inlet to the reactor tank through a second spray head 27 which also directs a fine spray onto splash plates 28 when valve 31 is opened and pump 5 operating. The passageway from the outlet through return inlet and conduit 34 provides the recycling and respraying for reduction of radon content of the water to background levels. Valve 31 may be, for example, a normally open ¾" (1.9 cm) solenoid valve. The second outlet pathway 32 is connected to the pressure tank 16 and water use system through check valve 36. A standard pressure switch 38, such as, for example, a 30–50 psi pressure switch is also coupled to this line, part of the control system hereafter described.

Figure 2:
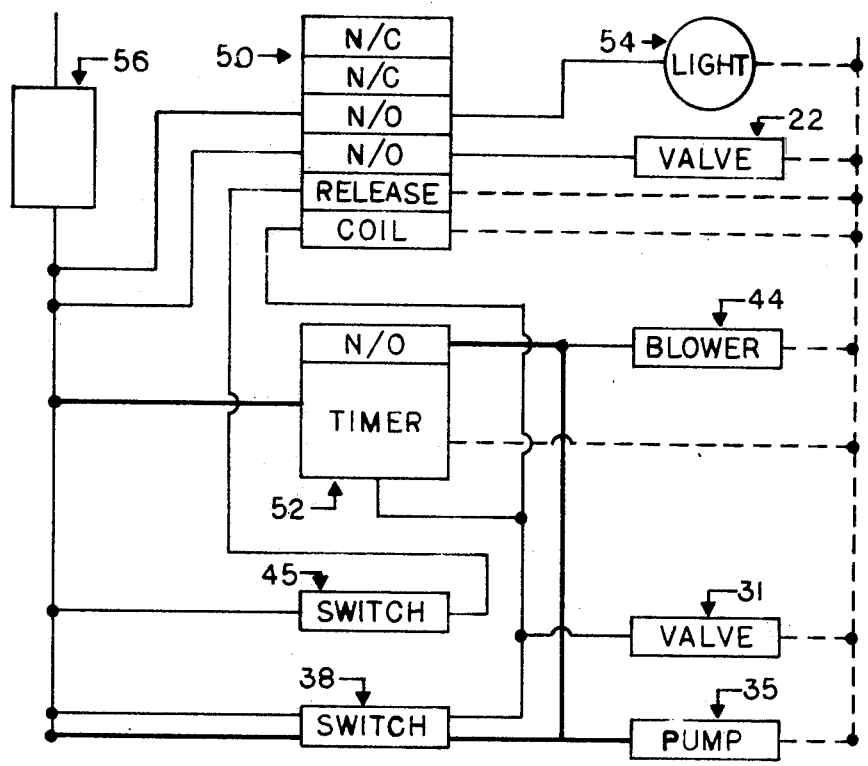
FIG. 2 is a schematic block diagram of the control system for the apparatus of FIG. 1.
Figure 3:
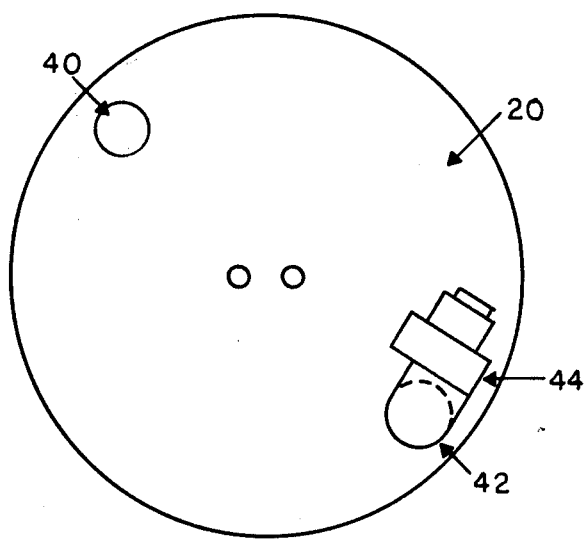
FIG. 3 is a simplified plan view of the top of the reactor tank.

Referring to FIGS. 1 and 3, ventilation of partitioned radon gas is accomplished through exhaust vent 40 at one side of the top portion of the reactor tank 20. The fresh air inlet vent 42 is spaced apart at other side of the tank. A blower 44 may be provided to force air through the top of the reactor tank for more efficient ventilation and removal of partitioned radon gas. The blower 44 as well as the pump 35 are controlled by a timer not shown in FIG. 1 and hereafter described with reference to the control system of FIG. 2. Further elements of the control system shown in FIG. 1 also include the liquid level or water level switch 45 contained in vertical conduit 46 communicating with the base of the reactor tank, for maintaining water at the desired level 48 in the tank. Vertical conduit 45 also provides an overflow outlet 47 just above the desired water level.

The method of operation and control sequence of the radon removal system is described with reference to the system of FIG. 1 and the control system block diagram of FIG. 2, in which corresponding elements are similarly numbered. The control system of FIG. 2 includes additional elements not shown in FIG. 1 including relay 50, timer 52, fill light indicator 54 and current source 56. The designations N.C. and N.O. refer respectively to the normally closed and normally open elements of the relay.

When the pressure in pressure tank 16 falls below a specified level because of use of water in the house, pressure switch 38 closes. Pressure switch 38 starts the pump 35 and activates normally open solenoid valve 31 which closes. Pressure switch 38 also starts timer 52 and locks in the latching relay 50. Relay 50 operates the normally closed solenoid valve 22 which opens letting fresh water into the reactor tank 20 through the first inlet 21 ands first spray head 25. Fill indicator light 54 is on when the reactor tank is filling. When the reactor tank 20 is full, the high water level activates the liquid level switch 45 which releases relay 50 thereby closing once again solenoid valve 22, shutting off water at the first inlet 21. In the meantime, pump 35 has restored pressure in pressure tank 16. The consequent deactivation of pressure switch 38 opens the solenoid valve 31 in the return inlet line 34. The pump 35 continues to operate due to the activation by adjustable timer 52. For a preset period of time, for example using a 0–60 minute timer, the pump recycles water through the return line 34 for respraying through spray head 27 onto splash plates 28 supported in the tank below spray heads 25 and 27. Radon gas separating from the sprayed and fragmented water droplets is vented through exhaust vent 40 to the outside. Blower 44 as shown in FIG. 3 is also controlled by timer 52 and facilitates exchange of air.

A plurality of tanks could of course be coupled in series, with the output of one leading to the initial input of the next. However, because of the self-contained recycling features of the present invention, a single tank and accompanying equipment is sufficient for significantly reducing radon content of the water. With three cycles of spraying, the radon removal efficiency is between 80% and 90%.

Although the invention has been described with reference to specific example embodiments, it will be appreciated that it is intended to cover all modifications and equivalents within the scope of the appended claims.

I claim:

1. A radon gas removal system for installation between a well or other water source and a water use system comprising:
  at least one reactor tank, first inlet means and first spray head means at the upper portion of said tank for spraying water from a well or other water source into said tank in a fine spray, outlet means comprising first and second outlet pathways at the base portion of said tank, said second outlet pathway comprising means for coupling to a water use system, second inlet means and second spray head means at the upper portion of said tank operatively coupled to said first outlet pathway for recycling and respraying the water in said tank, splash plate means supported in the tank for deflecting and dispersing water sprayed into the tank, pump means coupled at the outlet means, ventilation means including inlet and outlet vents at the top portion of said tank for venting released radon gas away from said tank, first valve means in the first inlet means, liquid level switch means operatively coupled to the tank and first valve means for closing said first valve means when the water level in the reactor tank reaches a specified level, second valve means in the outlet means first pathway, pressure switch means at the outlet means second pathway operatively coupled to the second valve means for closing said second valve means when pressure in the water use system falls below a specified pressure and for opening said second valve means when said specified pressure is restored, said pressure switch means also operatively coupled to the first valve means for opening said valve means when the pressure falls below the specified value, and timer means operatively coupled to said pump means and pressure switch means for activation by the pressure switch means to operate the pump means during a preset timer period whereby the reactor tank is regularly filled and maintained at a desired level, the pressure in a water use system coupled to the outlet means second outlet pathway is regularly restored and maintained at a desired level, and whereby water sprayed into the reactor tank is recycled and resprayed into the reactor tank during the preset timer period for removing and venting radon gas whenever the reactor tank is refilled.

2. The system of claim 1 further comprising blower means operatively coupled to the ventilation means, said timer means also coupled to the blower means to operate the blower means during the preset timer period.

3. The system of claim 1 further comprising relay means operatively coupled between the pressure switch means and first valve means for opening said valve upon activation of the pressure switch means, said relay means also operatively coupled between the liquid level switch means and the first valve means for closing said first valve means upon activation of the liquid level switch means.

4. The system of claim 1 wherein said means for coupling to a water use system comprises check valve means.

5. The system of claim 1 wherein said tank further comprises overflow outlet means.

6. The system of claim 3 further comprising fill indicator light means coupled through said relay means for indicating periods during which the first valve means is open and the tank is filling.

* * * * *